United States Patent
Gong et al.

(10) Patent No.: US 9,111,044 B2
(45) Date of Patent: Aug. 18, 2015

(54) AUTOMATED NETWORK TRIGGERING-FORWARDING DEVICE

(71) Applicant: Zhuhai Sunhome Information Co., Ltd., Qianshan, Xiangzhou District (CN)

(72) Inventors: Depin Gong, Zhuhai (CN); Chii Tsong Jang, Zhuhai (CN); Dehong Ding, Zhuhai (CN)

(73) Assignee: Zhuhai Sunhome Information Co., Ltd., Zhuhai, Guangdong (CN)

( * ) Notice: Subject to any disclaimer, the term of this patent is extended or adjusted under 35 U.S.C. 154(b) by 0 days.

(21) Appl. No.: 14/347,139

(22) PCT Filed: Dec. 26, 2012

(86) PCT No.: PCT/CN2012/087493
§ 371 (c)(1),
(2) Date: Mar. 25, 2014

(87) PCT Pub. No.: WO2013/143337
PCT Pub. Date: Oct. 3, 2013

(65) Prior Publication Data
US 2014/0237146 A1 Aug. 21, 2014

(30) Foreign Application Priority Data

Mar. 27, 2012 (CN) .......................... 2012 1 0082458
Mar. 27, 2012 (CN) ..................... 2012 2 0117645 U

(51) Int. Cl.
*G06F 13/38* (2006.01)
*G05B 19/04* (2006.01)
*G06M 3/08* (2006.01)

(52) U.S. Cl.
CPC .............. *G06F 13/385* (2013.01); *G05B 19/04* (2013.01); *G06M 3/08* (2013.01)

(58) Field of Classification Search
CPC ..... G06F 13/385; G06F 3/0383; G06F 3/038; G06F 3/0601; G01G 19/005
See application file for complete search history.

(56) References Cited

U.S. PATENT DOCUMENTS

| | | | |
|---|---|---|---|
| 2004/0004121 A1* | 1/2004 | Nakamura et al. | 235/441 |
| 2007/0221338 A1* | 9/2007 | Meewis et al. | 160/7 |
| 2008/0106726 A1 | 5/2008 | Park | |

FOREIGN PATENT DOCUMENTS

| | | |
|---|---|---|
| CN | 201662879 U | 12/2010 |
| CN | 202003210 U | 10/2011 |

(Continued)

*Primary Examiner* — Farley Abad
(74) *Attorney, Agent, or Firm* — Loginov & Associates, PLLC; William A. Loginov

(57) ABSTRACT

An automated network triggering-forwarding device connected with a control computer and an information input equipment by a network or a cable, respectively, is provided, which comprises a static output module, a dynamic forwarding module, and an information feedback module. A preset trigger signal is output by touching a key or combination of keys of a key output module, the output information of the information input equipment is forwarded to the control computer by the dynamic forwarding module, and the information fed back by the control computer is displayed on the feedback display module and a voice prompt is provided through the voice output module by the information feedback module. The buttons are imparted with different output definitions according to different service requirements, and tart triggering other recognizing devices to operate when needed according to operator demand. The dynamic output function can be externally connected with a plurality of non-network equipment.

8 Claims, 1 Drawing Sheet

(56) References Cited

FOREIGN PATENT DOCUMENTS

| CN | 102645900 | A | 8/2012 |
| CN | 202512392 | U | 10/2012 |
| WO | 2007086808 | A2 | 8/2007 |
| WO | WO 2007086808 | A2 * | 8/2007 |

* cited by examiner

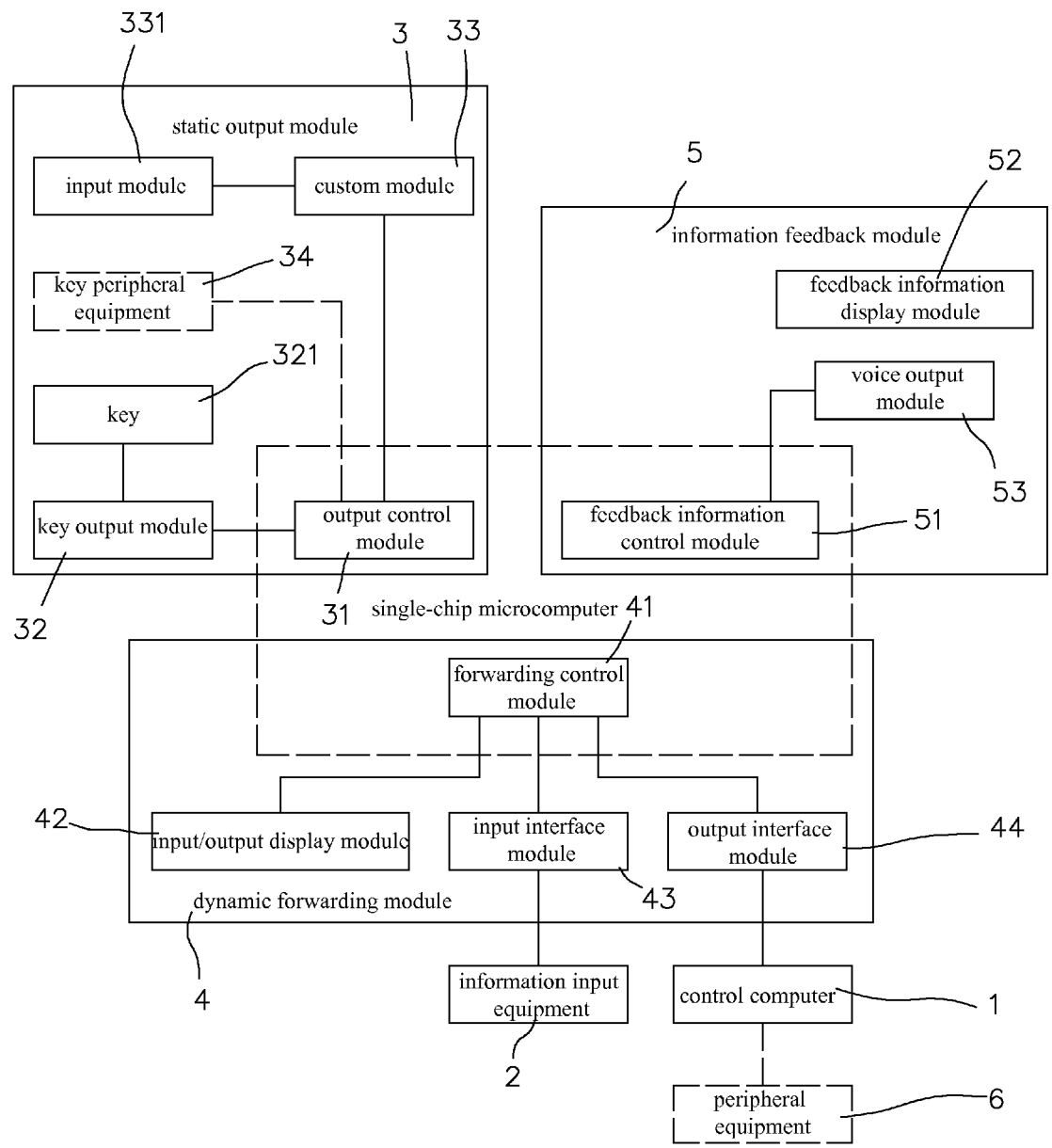

AUTOMATED NETWORK TRIGGERING-FORWARDING DEVICE

FIELD OF THE INVENTION

The present invention relates to the field of automated logistics and automated production, and in particular, to an automated network triggering-forwarding device.

BACKGROUND OF THE INVENTION

The automated triggering-forwarding device is mainly applied to the field of automated logistics and automated production, to solve the problem of starting and stopping the operation of other related equipments in an automation process. As in the field of logistics, by triggering the device, an RFID reader/writer, an electronic tag, a scanning gun, a LED display screen, and other related equipments may enter a working state, the field of logistics and production may enter a complete automated management process, the communication and session between human and equipments may be realized, and the connection session between equipments may also be realized. There are a large number of automatic trigger devices in the present market, such as infrared sensing, pressure-sensitive recognition, visual recognition, temperature recognition, flow recognition, and so on. However, these devices have some defects more or less in certain application situations:
  1. In some special application environments, there is no way to trigger according to human's subjective willing.
  2. The information triggering is lack of a target, for example, the infrared sensing, the pressure-sensitive sensing, and the like would be triggered as long as an object passes, and transmit some undesired trigger information, causing the information to be inaccurate, and also bringing a corresponding burden to the operation of other automatic equipments (the functioning is ineffective, the storage space of the system is occupied, and multiple filterings are required to obtain the correct data).
  3. Some sensing trigger devices cannot pass the check information directly to other network equipments (a computer, a LED display screen, and the like).
  4. The equipment without a network function cannot forward the information to the network.
  5. The fabricating costs of the automated triggering devices, such as the infrared sensing device, the pressure-sensitive recognition device, the visual recognition device, and the like, in the present market are all relatively high.

SUMMARY OF THE INVENTION

In order to overcome the above defects and satisfy the demand of the market, the present invention aims at providing an automated network triggering-forwarding device, realizing static and dynamic triggers, and providing an information feedback function.

The technical solution adopted by the present invention is:

An automated network triggering-forwarding device connected with a control computer and an information input equipment by a network or a cable, respectively, the device comprising a static output module, a dynamic forwarding module, and an information feedback module, wherein the static output module comprises an output control module and a key output module, the key output module has at least one key, the output of which may be customized, a preset trigger signal is output by manually touching a different key or a combination of keys, and then, the operation of the information input equipment or other peripheral equipments is started or stopped by the control computer; the dynamic forwarding module comprises a forwarding control module, an output/input display module, an input interface module, and an output interface module, wherein the input interface module is connected with the information input equipment, and the output interface module is connected with the control computer to forward the output data of the information input equipment to the control computer; the information feedback module comprises a feedback information control module, a feedback information display module, and a voice output module, the information fed back by the control computer is displayed on the feedback display module, and a voice prompt is provided by the voice output module.

As an improvement of the above technical solution, the output/input display module and the voice output module are connected with the static output module, respectively, receive the trigger signal it outputs, and display the signal or provide a voice prompt.

As an improvement of the above technical solution, each key of the static output module in the connected automated network triggering-forwarding device may be defined, modified, and stored by the control computer.

As an improvement of the above technical solution, the static output module further comprises a custom module, which comprises an input module.

As an improvement of the above technical solution, the static output module has an interface, which may connect other key peripheral equipments.

As an improvement of the above technical solution, the input interface module comprises one or more of a universal serial bus (USB) interface, a serial port, a parallel port, an RJ-45 network interface, and a wireless network interface.

As an improvement of the above technical solution, the output interface module comprises one or more of a universal serial bus (USB) interface, a serial port, a parallel port, an RJ-45 network interface, and a wireless network interface.

As an improvement of the above technical solution, the output/input display module comprises a liquid crystal display screen.

As an improvement of the above technical solution, the feedback display module comprises a liquid crystal display screen.

The beneficial effects of the present invention are:

The following benefits may be gained by applying the automated network triggering-forwarding device provided by the present invention:
  1. Through a few manual operations, the device may start triggering other recognizing devices to operate when needed and stop triggering the other recognizing devices to operate when not needed according to user's willing, extending the service life of the other recognizing devices (an RFID reader/writer, a LED display screen, a computer, and so on), as well as saving human resource significantly.
  2. In the static output function of the device of the present invention, the buttons are imparted with different characters and voice output functions according to different service requirements, making the recognized target more clear, and making up for the problem of being unable to definitely issue a trigger instruction in other sensing systems. Further in connection with the cluster information of warehousing and ex-warehousing, the target and number of the automatic recognizing and reading are made clear, the complexity of the software logic judgment is reduced, and the accuracy of the data is also guaranteed. For example, in the scene of product warehousing, the definition given to the buttons of the trigger is: pressing 1 represents that one cluster need to be warehoused, pressing 2 represents that two clusters need to be warehoused, and so on. If an warehousing person presses 2, but the RFID reads 3 clusters or 1 cluster, an warehousing information error would be prompted on the LED display screen, the RFID reader/writer would stop reading the card, the warehousing person may correct the error by examining the error information, and the warehousing may not be carried out until the data is accurate.

3. In connection with the dynamic output function of the device, the device of the present invention may be externally connected with a plurality of non-network equipments. For example, a scanning gun is externally connected by the USB interface, and uploads the scanned information directly to the network, and the computer checks the accuracy of the data and save it. The equipment may also convert other input equipments to network input equipments. If an electronic scale doesn't have the network function, the electronic scale would be connected to the serial port of the device, and the weight information got by the electronic scale would be directly uploaded to the network through the device.

4. In the case that no principle need to be changed on the trigger forwarder, in the present invention, each button on the triggering-forwarding device is imparted with a different output character and voice according to different scenes of logistics and production, making the triggering-forwarding device suitable for each procedure and field of the logistics and production.

5. The trigger forwarder of the present invention may be externally connected with a variety of network equipments, to achieve the mutual transmission of information between the Internets of things.

6. The operation is simple, and the implementation is convenient. The operation of the entire logistics procedure can be accomplished accurately by manually and gently triggering the button, truly realizing the process of the Internet of things on production and logistics.

7. Compared with other automation devices, the fabricating cost of the device is relatively lower.

BRIEF DESCRIPTION OF THE DRAWINGS

The invention description below refers to the accompanying drawings, of which:

FIG. 1 is a block diagram of the principle of the present invention.

DETAILED DESCRIPTION

Referring to FIG. 1, an automated network triggering-forwarding device disclosed by the present invention is connected with a control computer 1 and an information input equipment 2 by a network or a cable, respectively, and composed of several main modules to achieve several functions required by the present invention.

First, the present invention has a static output module 3, which may be customized, to achieve a manual triggering function. The static output module 3 comprises an output control module 31 and a key output module 32, wherein the key output module 32 has at least one key 321, the output of which may be customized, a preset trigger signal is output by manually touching a different key 321 or a combination of keys 321, and then, the operation of the information input equipment 2 or other peripheral equipments 6 is started or stopped by the control computer 1. For example, 4 basic keys 321 may be used, and a corresponding character and voice information may be output fixedly by pressing a key or another similar key module that is externally connected (an indirect operation of touching the button may be accomplished by externally connecting other similar key peripheral equipments 34 through an additional interface on the static output module 3, such as a switch, an analog switch, a weak current switch, and so on). The service corresponding to the specific character and voice information may be customized, which is achieved by rewriting the firmware information in the device through the externally connected control device, such as the control computer 1, or building a control function in the device directly, that is, adding a custom module 33 connected with the output control module 31 and an in-built input module 331, through which the output of the key 321 may be customized. The output of the different keys 321 is defined when the device starts initialization, for example, pressing the first key may output 123, and pressing the second key may output ABC. The output information is transmitted to the control computer 1 through the network or the cable, to trigger starting or stopping the operation of other peripheral equipments, and transfer the information required by other services by the way.

Besides, the present invention also has a dynamic output module 4, which comprises a forwarding control module 41, an output/input display module 42, an input interface module 43, and an output interface module 44, wherein the input interface module 43 is connected with the information input equipment 2, and the output interface module 44 is connected with the control computer 1 to forward the output data of the information input equipment 2 to the control computer 1. For example, the non-network information input equipment 2 is converted to the information input equipment 2 with a network ability, that is, the output signal of the non-network equipment is transmitted to the control computer 1 via the network as a relay equipment.

In a preferred embodiment, the triggering-forwarding device of the present invention has a plurality of input/output interfaces, wherein the input interface module 43 comprises one or more of a universal serial bus (USB) interface, a serial port, a parallel port, an RJ-45 network interface, and a wireless network interface; similarly, the output interface module 44 comprises one or more of a universal serial bus (USB) interface, a serial port, a parallel port, an RJ-45 network interface, and a wireless network interface. Drivers of the common information input equipments are also built in the firmware of the forwarding control module 41 in the present invention, such as drivers of a scanning gun, a keyboard, a temperature sensor, and so on, to support these equipments and receive the signals sent by the equipments.

Moreover, through these interfaces, the forwarding control module 41 may transform the output of the information input equipments 2 with different interfaces to a single interface output.

Furthermore, in a preferred embodiment, the output/input display module 42 is a liquid crystal display screen, and may display the information transmitted by the information input equipment 2 in real time.

For example, the input interface module 43 of the dynamic output module 4 may comprise three flat USB interfaces, a square USB interface, and a serial port, essentially encompassing the interfaces of most of the existing equipments. The trigger forwarder receives the input information of the connected non-network information input equipments, such as the scanning gun, the keyboard, the temperature sensor, and the like, and then outputs it through the network interface, playing a function of forwarding. As another example, in a logistics automated management system, in some situations, a scanning gun or a keyboard is required to enter the goods information, but the scanning gun, the keyboard, and the like in the present market do not have the network function. The current practice is providing each scanning gun and keyboard with a corresponding computer, and then transferring the data to a central computer (the control computer) through the network function of the computer to be processed centrally. It not only increases the equipment investment and occupies the valuable space, but also reduces the reliability of the system due to the increasing of the equipments. However, if the triggering-forwarding device provided by the present invention is used, the scanning gun and the keyboard may be provided with the network function, thereby transmitting the data to the control computer arranged centrally through the network, reasonably utilizing the resources, avoiding a waste caused by repeated investments, and increasing the reliability of the system.

The device of the present invention also has an information feedback module, the information feedback module 5 comprises a feedback information control module 51, a feedback information display module 52, and a voice output module 53, to display the information fed back by the control computer 1 on the feedback display module 52 and provide a voice prompt by the voice output module 53, in order to extend a simplex equipment to a semi-duplex equipment. Specifically, it may receive the feedback information fed back by the control computer 1 through the network interface, then display the information on the liquid crystal display screen of the feedback information display module 52, and at the same time, play a voice prompt through the voice output module 53. For example, the scanning gun in the present market can only read bar codes and input the bar code information to the computer, but cannot receive the feedback information from the control computer. However, after installing and using the triggering-forwarding device of the present invention, the input information of the scanning gun is forwarded to the control computer 1 by the equipment, and then, the control computer 1 determines whether the information is correct or not, and feeds back corresponding text and voice information. The information input equipment with a simplex function may be extended to a semi-duplex equipment by this equipment.

In a specific implementation, the control core of each module, including the output control module 31, the forwarding control module 41, and the feedback information control module 51, may be realized by a same single-chip microcomputer, the network connection is realized by a POE network chip, the voice output module 53 is realized by an SYN6288 text-to-speech chip, and the feedback information display module 52 and the output/input display module 42 may use a same liquid crystal display screen.

Through a few manual operations, the present invention may start triggering other recognizing devices to operate when needed and stop triggering the other recognizing devices to operate when not needed according to human's willing, extending the service life of the other recognizing devices (an RFID reader/writer, an LED display screen, a computer, and so on), as well as saving human resource significantly. In the static output function of the device of the present invention, the buttons are imparted with different characters and voice output functions according to different service requirements, making the recognized target more clear, and making up for the problem of being unable to definitely issue a trigger instruction in other sensing systems. Further in connection with the cluster information of warehousing and ex-warehousing, the target and number of the automatic recognizing and reading are made clear, the complexity of the software logic judgment is reduced, and the accuracy of the data is also guaranteed. In connection with the dynamic output function of the present invention, a plurality of non-network equipments may be externally connected, to achieve the mutual transmission of information between the Internets of things. Compared with other automation devices, the fabricating cost of the device is relatively lower.

The above description is only the preferred implementation of the present invention, and does not limit the protection scope of the present invention. All things that achieve the purposes of the present invention by substantially the same means should fall within the protection scope of the present invention.

What is claimed is:

1. An automated network triggering-forwarding device, connected with a control computer and an information input equipment by a network or a cable, respectively, wherein:
the device comprises a static output module, a dynamic forwarding module, and an information feedback module, wherein the static output module comprises an output control module and a key output module, the key output module, has at least one key, each key of the static output module in the connected automated network triggering-forwarding device may be defined, modified, and stored by the control computer, the output of which may be customized, a preset trigger signal is output by manually touching a different key or a combination of keys, and then, the operation of the information input equipment or other peripheral equipment is started or stopped by the control computer; the dynamic forwarding module comprises a forwarding control module, an output/input display module, an input interface module, and an output interface module, wherein the input interface module is connected with the information input equipment, and the output interface module is connected with the control computer to forward an output signal of the information input equipment to the control computer; the information feedback module comprises a feedback information control module, a feedback information display module, and a voice output module, the information fed back by the control computer is displayed on the feedback display module, and a voice prompt is provided by the voice output module.

2. The automated network triggering-forwarding device according to claim 1, wherein: the output/input display module and the voice output module are connected with the static output module, respectively, receive the trigger signal it outputs, and display the signal or provide a voice prompt.

3. The automated network triggering-forwarding device according to claim 1, wherein: the static output module further comprises a custom module connected with the output control module, wherein the custom module comprises an input module.

4. The automated network triggering-forwarding device according to claim 1, wherein: the static output module has an interface, which may connect other key peripheral equipments.

5. The automated network triggering-forwarding device according to claim 1, wherein: the input interface module comprises one or more of a universal serial bus interface, a serial port, a parallel port, an RJ-45 network interface, and a wireless network interface.

6. The automated network triggering-forwarding device according to claim 1, wherein: the output interface module comprises one or more of a universal serial bus interface, a serial port, a parallel port, an RJ-45 network interface, and a wireless network interface.

7. The automated network triggering-forwarding device according to claim 1, wherein: the output/input display module comprises a liquid crystal display screen.

8. The automated network triggering-forwarding device according to claim 1, wherein: the feedback information display module comprises a liquid crystal display screen.

* * * * *